July 23, 1957  A. L. BASTIAN  2,800,626
MAGNETIC AMPLIFIER CIRCUIT
Filed Nov. 14, 1952

INVENTOR.
ARTHUR L. BASTIAN
BY Frank A. Bowers
ATTORNEY

United States Patent Office 2,800,626
Patented July 23, 1957

2,800,626

MAGNETIC AMPLIFIER CIRCUIT

Arthur L. Bastian, Yonkers, N. Y., assignor to Ward Leonard Electric Company, a corporation of New York Application November 14, 1952, Serial No. 320,482

5 Claims. (Cl. 323—89)

This invention relates to magnetic amplifiers and is directed particularly to magnetic amplifiers for controlling electrical devices.

An object of the invention is to provide a magnetic amplifier with high gain characteristics that is substantially linear over a range from a low load voltage to a high load voltage.

Another object of the invention is to provide a magnetic amplifier that is more uniform in speed of response over the entire impedance range.

Another object of the invention is to increase the speed of response of the magnetic amplifier particularly at the high impedance end of the impedance range.

Another object of the invention is to reduce the amount of negative bias required to obtain maximum impedance.

A further object of the invention is to provide a magnetic amplifier that is inexpensive to manufacture and has a minimum of rectifiers while yet retaining the high gain characteristics of magnetic amplifiers.

Other and further objects and advantages will be apparent from the following description taken in connection with the accompanying drawing illustrating various embodiments of the invention in which.

Figure 1:
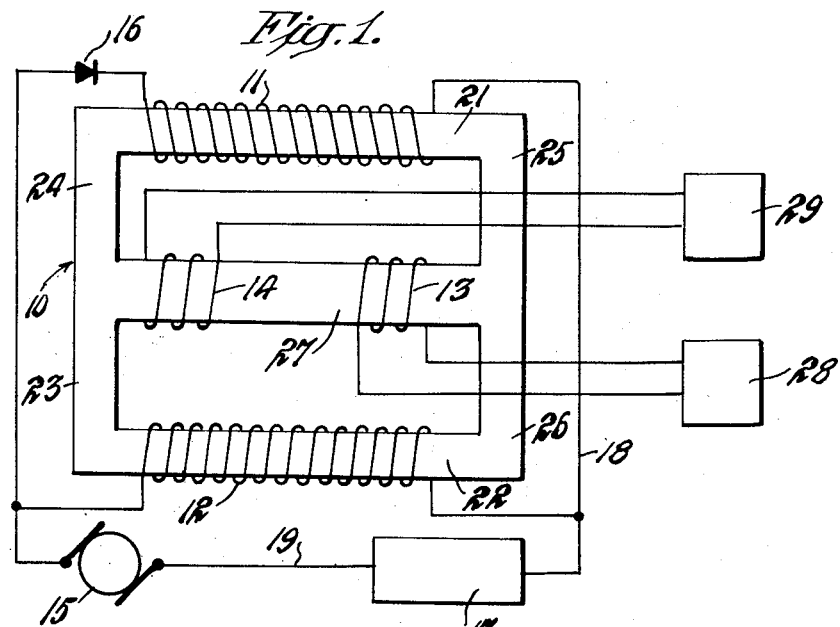
Fig. 1 illustrates an embodiment with a three-legged core.

The preferred embodiment shown in Fig. 1 has a laminated ferromagnetic core 10 of the three-legged type with anode windings 11 and 12 on the outer legs and control winding 13 and bias winding 14 on the center leg.

The load 17 may be the usual type controlled by magnetic amplifiers or for regulating the illumination of lights. Current is supplied to the load from an alternating current source 15. In this load circuit, the anode windings are in parallel, each being in series with the winding 11 to form a conductive path on one-half of the cycle of the current, through the rectifier 16, winding 11, and load 17 back to the source 15. On the other half of the cycle, the conductive path is through the load 17 and winding 12 to the source 15. The winding 12 is connected across the rectifier 16 and winding 11 so that the load current passes through the winding 12 without passing through the opposing rectifier 16.

The load current is controlled by the impedance of the anode windings 11 and 12. The impedance of the anode windings is responsive to the control current in the control windings and varies inversely to the changes in the control current. As the control current is increased, the impedance of the anode windings decreases and the voltage across the load increases. The control winding 13 is connected to an adjustable direct current source 28 and the value of the current through the control winding may be set by the source 28. The winding 14 is connected to a direct current source to supply a current to set the amplifier in its proper operating range.

On one portion of the alternating cycle the current supplied by the source 15 to the windings 11 and 12 passes from the source 15 through the rectifier 16, the anode winding 11 to the load 17 through the wire 18. On the other half of the cycle, the current passes from the source 15 through line 19 to the load 17 and thence through the winding 12 back to the source.

The rectifier 16 blocks the current from passing through winding 11 on the half cycle passing through the winding 12. On reversal in polarity, the rectifier 16 conducts and passes the current through the winding 11 because of the opposition of a potential induced across coil 12 in accordance with Faraday's induction law. A decrease in the current through winding 12 on its conducting half cycle is accompanied by an induced potential across winding 12 opposing a current reversal. A similar voltage is induced across the winding 11 on alternate half cycles but does not affect the operation of the circuit. Thus, with only one rectifier, the alternate conduction of the windings 11 and 12 is attained. During the half cycle when current is passing through winding 11, the voltage across winding 12 decreases and there may be a small passage of load current through the winding 12.

In considering the magnetomotive forces of the various windings, it should be noted that the rectifier 16, winding 11, line 18, and winding 12 form a closed loop circuit providing a path for a direct current. Each half cycle of current through the respective anode windings may be considered to have an alternating component and a non-alternating component. The fundamental alternating components in the windings 11 and 12 are in phase and the windings 11 and 12 are wound to produce magnetomotive forces that are in the same direction through the legs 21, 25, 26, 22, 23, 24 forming a common flux path and cancelling in the center leg 27. The non-alternating component may be considered to circulate through the closed loop and produce a magnetomotive force in the core that is in the same direction as the magnetomotive force of the current in the control winding 13 in the outer legs 21, 22. This magnetomotive force, when produced by the non-alternating component passing through the winding 11, is in the same direction in leg 21 as the magnetomotive force produced by the current in the control winding 13. This non-alternating magnetomotive force, when produced by the non-alternating component through winding 12, is in the same direction as the magnetomotive force produced by the current passing through the control winding 13. The non-alternating magnetomotive force of winding 11 may be considered to circulate through the legs 21, 24, 27, 25 and the non-alternating magnetomotive force of the winding 12 may be considered to circulate through legs 22, 26, 27, 28. The non-alternating magnetomotive forces and the control magnetomotive force are additive in the center leg. This additive relation of the non-alternating magnetomotive forces and the control winding magnetomotive forces contributes to the saturation of the core.

The bias winding may produce a magnetomotive force in the core in either direction depending on the particular characteristics to be compensated, for the particular type of response desired.

The reactor is preferably balanced magnetically about a center line extending longitudinally through the center leg 27. With a symmetrical core and anode windings 11 and 12 with equal windings, balanced magnetomotive forces are produced which reduce the linkage with the control winding 13 to a negligible amount.

The induced current of winding 12 cannot pass through the source 15 due to the reversal in polarity and, therefore, passes through the rectifier 16, the winding 11 and through the line 18, back to the winding 12. A similar condition also occurs in winding 11 when the polarity in the source 15 reverses to pass the anode current through the winding 12. The magnetomotive force of the winding 11 creates a current in the same direction as the anode current passing through the winding 11. This induced current passes through the line 18 and due to the reversed polarity of the source 15 shunts through the winding 11 and through the rectifier 16. Thus, the closed loop of the rectifier 16, winding 12, line 18 and winding 12 provides a discharge path for the residual fluxes coupled with the windings 11 and 12. This induced current provides the self-saturated current necessary for the high gain operation of the amplifier.

The core 10 may be of the EI laminated type; the windings are wound on the legs 21, 27 and 22 and the magnetic path completed by the end or side piece interleaving with the laminations of the legs to minimize the affect of the air gaps between the two pieces of the core. The side formed by the portions 23, 24 fits into the E shaped portion made up by the legs 21, 27, 22 and the side portions 25, 26.

Figure 2:
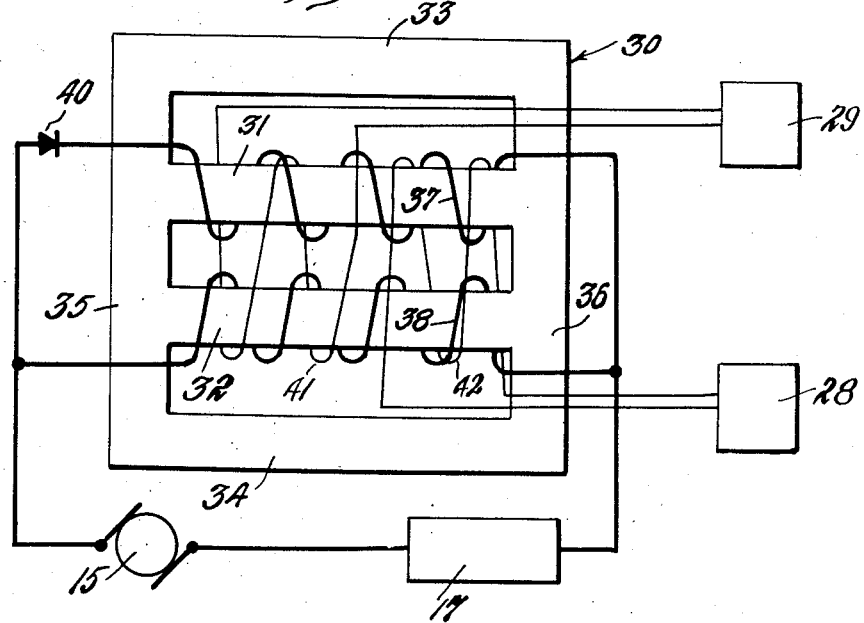
Fig. 2 illustrates an embodiment with a four-legged core.

In another embodiment shown in Fig. 2, the invention is shown with a four-legged laminated core 30 having two inner legs 31, 32 and two outer legs 33, 34 connected at their ends by side pieces 35, 36. Anode windings 37, 38 are wound on the inner legs 31, 32 respectively. The control and bias windings are looped around the two inner legs together. The circuit arrangements connecting the anode windings to the source 15 and load 17 are the same as in Fig. 1. The core is symmetrical and the outer legs 33, 34 provide a flux path for the currents in the adjacent anode winding. The circulating direct current through the rectifier 40, winding 37 and winding 38 produces a magnetomotive force in leg 31 in the same direction as the magnetomotive force of the control current. The magnetomotive forces created by winding 38 in leg 32 are in the same direction as the magnetomotive forces created by the winding 37 in leg 31. Conversely, the winding 37 and core 30 produce a magnetomotive force in the same direction as that created by winding 38. The magnetomotive forces of the control windings will pass through the outer legs 33, 34, respectively. In considering the various components, the alternating component of the anode current creates magnetomotive forces in the legs 31, 32 which are in the same direction in a given leg. The core 30 is preferably symmetrical and the windings 37, 38 are balanced to produce a balanced operation.

The rectifiers 16 and 40 have low inverse voltages and this may be further reduced by a resistor connected across the rectifier. This method of reduction of the inverse voltage improves the linearity and speed of response. The resistor may be adjustable so that with a plurality of amplifiers, the differences in back resistance may be compensated for.

The magnetic amplifier heretofore described has a high linear gain over a wide range from a low load voltage to a high load voltage. In one example, a range of load voltage from 20 volts to 102 volts is attained with a change in ampere turns of the control winding of 100 to 400 ampere turns. A comparable saturable reactor would not produce half of the gain over the same range of ampere turns of control.

The speed of response of the low end of the impedance range is faster than the speed of response of a conventional magnetic amplifier. Thus, the response of the amplifier is more linear over the entire impedance range.

The wide range of control provided by this circuit makes it readily adaptable to the control of electrical equipment which requires a uniformity of response with a high gain over a wide range of operation. This circuit may be utilized for controlling the illumination of banks of electric lights. The single rectifier in the circuit reduces the cost of the equipment and makes it competitive with other types of control apparatus which was not possible with previous magnetic amplifier circuits.

Various other modifications and changes may be made without departing from the scope of the invention.

I claim:

1. A magnetic amplifier comprising a ferromagnetic core, two anode windings and a control winding adapted to pass a direct current to create a magnetomotive force in said core, a single rectifier connected in series with only one of said anode windings to pass anode current in one direction and said other anode winding being directly connected in parallel across said sole rectifier and said first anode winding and adapted to pass anode current in one direction and to pass in the opposite direction a current circulating through the closed loop formed by said rectifier and said anode winding.

2. A magnetic amplifier comprising a ferromagnetic core having a common flux path, two anode windings forming a main winding combination for amplification of the main circuit passing through the amplifier and a control winding adapted to pass a direct current to create a magnetomotive force in opposite directions in different portions of a common flux path, said anode windings each wound to produce a magnetomotive force in the same direction in said common flux path, a rectifier forming the sole rectifying means of said main winding combination, said rectifier connected in series with only one of said anode windings and said other winding connected in parallel across said sole rectifier and said first anode winding to pass alternate half-cycles of current from an alternating source to a controllable load in one direction and to pass in the opposite direction a current circulating through the closed loop formed by said rectifier and said anode winding.

3. A magnetic amplifier comprising a ferromagnetic core having two outer legs having first and second anode windings respectively, said anode windings wound to alternately produce magnetomotive forces in the same direction in said outer legs, a rectifier connected in series with said first winding, and said second winding directly connected in parallel with said rectifier and said first anode winding said rectifier forming the sole rectifying means in the first and second anode winding combination, said second anode winding creating an induced current passing through said anode windings in a direction reverse to the anode current through said second anode winding and said rectifier to produce a magnetomotive force contributing to the saturation of said core in the same direction as the magnetomotive force produced by the anode current through the first winding.

4. A magnetic amplifier comprising a ferromagnetic core having two inner legs and two outer legs, first and second anode windings, each wound on a respective inner leg, an alternating current source, a single rectifying means for said first and second anode windings said rectifying means being connected in series with said first anode winding, said second anode winding directly connected in parallel with said series rectifying means and first anode winding to form a closed loop, said alternating current source coupled across said first anode winding and rectifying means in series and connected directly across said second anode winding in parallel to alternately supply said windings with anode current, said rectifying means blocking alternate cycles to pass the anode current through said second anode winding, said first and second anode windings wound so that each creates a flux in the same direction through said inner legs on the respective conductive cycle and on the non-conductive cycle creating an induced current which circulates through said closed loop in one direction to provide a self-saturating amplifier.

5. A magnetic amplifier adapted to be connected to an alternating current supply to provide a main current comprising a single rectifier means, a ferromagnetic core having at least two legs, a first winding adapted to be directly connected across an alternating current supply, a second winding and said single rectifier means connected in series therewith adapted to be connected across said alternating current supply to pass the main current during one half cycle and directly connected in series with said first winding to form a closed loop for passing a circulating current in one direction, said first winding passing the main current in the other direction and blocking the main current in the direction of the circulating current by an induced flux.

References Cited in the file of this patent

UNITED STATES PATENTS

| | | |
|---|---|---|
| 2,126,790 | Logan | Aug. 16, 1938 |
| 2,674,705 | Schwieg | Apr. 6, 1954 |

OTHER REFERENCES

Publication entitled "Magnetic Amplifier," published by the Vickers Electric Division, 1949.